US012809323B2

(12) United States Patent
Nawata et al.

(10) Patent No.: US 12,809,323 B2
(45) Date of Patent: Nov. 24, 2026

(54) FEEDBACK CONTROL DEVICE THAT SUPPRESSES DISTURBANCE VIBRATION USING MACHINE LEARNING, ARTICLE MANUFACTURING METHOD, AND FEEDBACK CONTROL METHOD

(71) Applicant: CANON KABUSHIKI KAISHA, Tokyo (JP)

(72) Inventors: Ryo Nawata, Tokyo (JP); Yuichiro Miki, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 444 days.

(21) Appl. No.: 18/484,682

(22) Filed: Oct. 11, 2023

(65) Prior Publication Data

US 2024/0036531 A1 Feb. 1, 2024

Related U.S. Application Data

(63) Continuation of application No. 17/481,611, filed on Sep. 22, 2021, now Pat. No. 11,815,861.

(30) Foreign Application Priority Data

Oct. 2, 2020 (JP) ................................ 2020-167743

(51) Int. Cl.
*G05B 19/404* (2006.01)
*G05B 13/02* (2006.01)

(52) U.S. Cl.
CPC ......... *G05B 13/027* (2013.01); *G05B 19/404* (2013.01); *G05B 2219/41134* (2013.01)

(58) Field of Classification Search
CPC ................ G05B 13/027; G05B 19/404; G05B 2219/41134; G05B 2219/31013;
(Continued)

(56) References Cited

U.S. PATENT DOCUMENTS 4,893,066 A * 1/1990 Stewart ................ G05B 19/232 318/632
5,159,660 A * 10/1992 Lu ........................ G05B 13/027 700/48
(Continued)

FOREIGN PATENT DOCUMENTS

JP 2019071405 A * 5/2019 ......... G05B 13/0265

OTHER PUBLICATIONS

Asano, T. English translation of JP-2019071405-A, May 2019 (Year: 2019).*
(Continued)

*Primary Examiner* — Jonathan Michael Skrzycki
(74) *Attorney, Agent, or Firm* — ROSSI, KIMMS & McDOWELL LLP

(57) ABSTRACT

The feedback control device takes information regarding a control deviation between a measured value and a target value of a controlled object as input, and outputs a control amount for the controlled object; comprising: a first control unit that takes information regarding the control deviation as input, and outputs a first control amount for the controlled object; a second control unit that takes information regarding the control deviation as input and outputs a second control amount for the controlled object, and in which a parameter for calculating the second control amount is determined by machine learning; an operation unit that operates the controlled object using the first control amount output from the first control unit and the second control amount output from the second control unit; and a sampling unit for thinning out at a predetermined period information regarding the control deviation input to the second control unit.

14 Claims, 7 Drawing Sheets

(58) Field of Classification Search
CPC ........... G05B 2219/39278; G05B 2219/41122; G05B 2219/42005; G05B 2219/42033; G05B 2219/45028; G05B 11/42; G05B 13/02; Y02P 90/02; G03F 7/20
See application file for complete search history.

(56) References Cited

U.S. PATENT DOCUMENTS

| | | | |
|---|---|---|---|
| 5,396,415 A | | 3/1995 | Konar et al. |
| 5,598,508 A | * | 1/1997 | Goldman ............. A61B 5/7264 706/20 |
| 6,760,716 B1 | | 7/2004 | Ganesamoorthi et al. |
| 2015/0227654 A1 | | 8/2015 | Hunsche et al. |
| 2018/0283354 A1 | | 10/2018 | Hammerum et al. |
| 2020/0006102 A1 | | 1/2020 | Lin et al. |
| 2020/0233316 A1 | | 7/2020 | Asano |

OTHER PUBLICATIONS

James, C. "Synthesis, Stability Analysis, and Implementation of a Multirate Repetitive Learning Controller", 1999. Found online URL:<https://ieeexplore.IEEE.org/stamp/stamp.jsp?tp=&arnumber=803245> (Year: 1999).*

James "Synthesis, Stability Analysis, and Experimental Implementation of a Multirate Repetitive Learning Controller." Proceedings of the 1999 IEEE/ASME International Conference on Advanced Intelligent Mechatronics. Sep. 1999: pp. 653-658.

Office Action issued in U.S. Appl. No. 17/481,611, mailed on Mar. 3, 2023.

Notice of Allowance issued in U.S. Appl. No. 17/481,611, mailed on Jul. 13, 2023.

* cited by examiner

FEEDBACK CONTROL DEVICE THAT SUPPRESSES DISTURBANCE VIBRATION USING MACHINE LEARNING, ARTICLE MANUFACTURING METHOD, AND FEEDBACK CONTROL METHOD

BACKGROUND OF THE INVENTION

Field of the Invention

The present invention relates to a feedback control device and the like that uses machine learning.

Description of the Related Art

As control devices for controlling the physical amount of a target object, classic controllers such as those based on PID (Proportional-Integral-Differential) control are often used. In recent years, besides control systems based on classical control theories or modern control theories, control systems using machine learning (including reinforcement learning) are also used.

In addition, control systems combining a control system not including machine learning and a control system based on machine learning are also used. A feedback control device described in Japanese Patent Laid-Open No. 2019-71405 uses both a control system that does not include machine learning and a control system based on machine learning, and by providing a limiter on the output of the control system based on machine learning, prevents a reduction in the reliability of the feedback control device.

However, the feedback control device of the prior art, which uses a control system that does not include machine learning and a control system based on machine learning, has the following problems. Generally, in feedback control devices that use PID controllers and the like that do not include machine learning, the sampling frequency of the control system is increased in order to improve control performance. As sampling frequency is increased, sampling time is shortened, and responsiveness is improved.

In contrast, a control system based on machine learning inputs several samples of control deviation data into a neural network (hereinafter referred to as "NN") and outputs control commands. The time length of the control deviation data input to an NN is the sampling time×number of samples. As the sampling time becomes shorter, the time length of control deviation data input to the NN becomes shorter. When it is desired to suppress low-frequency disturbance vibration in particular by a control system based on machine learning, if the control deviation data has a short time length, only a small portion of the low-frequency disturbance vibration that is desired to be suppressed will be included in the control deviation data. In such a state, machine learning does not proceed well, and the control system based on machine learning cannot suppress low-frequency disturbance vibration.

Thus, one of the objects of the present invention is to provide a feedback control device that can effectively suppress disturbance vibration using a control system based on machine learning.

SUMMARY OF THE INVENTION

In order to achieve this object, a feedback control device according to one aspect of the present invention is a feedback control device that takes information regarding a control deviation between a measured value and a target value of a controlled object as input, and outputs a control amount for the controlled object, comprising: at least one processor or circuit configured to function as: a first control unit configured to take information regarding the control deviation as input, and to output a first control amount for the controlled object; a second control unit configured to take information regarding the control deviation as input and to output a second control amount for the controlled object, and in which a parameter for calculating the second control amount is determined by machine learning; an operation unit configured to operate the controlled object using the first control amount output from the first control unit and the second control amount output from the second control unit; and, a sampling unit configured to thin out at a predetermined period information regarding the control deviation input to the second control unit.

Further features of the present invention will become apparent from the following description of embodiments with reference to the attached drawings.

DESCRIPTION OF THE EMBODIMENTS

Hereinafter, preferred embodiments of the present invention will be described in detail on the basis of the accompanying drawings. Note that a controlled object to be described is not limited to each embodiment, and the type of controlled object is not limited as long as it is a physical amount usable in feedback control. Typical controlled objects are listed below. Exemplary controlled objects include the displacement in the linear and rotational directions, velocity, or acceleration of an object, and the flow rate, flow velocity, or pressure of gas or fluid. In each drawing, the same reference numbers are applied to the same members or elements, and duplicate descriptions will be omitted or simplified.

Other exemplary controlled objects include the liquid level of fluid, the temperature of an object, gas, or liquid, and the electric current, voltage, or charge of an electric circuit. In addition, other exemplary controlled objects include a magnetic flux in a magnetic field, a magnetic flux density, or the sound pressure of a sound field. These physical amounts are measured by sensing units using known sensors, and the measured value is input to a control device. A controlled variable drive unit is an active element that applies a change to the physical amount of the controlled object, and, when the controlled object is the position, velocity, or acceleration of an object, motors, piezo-elements, or the like are used. Pumps, valves, or the like can be used for gas, fluid, or the like. A driver or the like that controls electric current or voltage is used for an electric system.

First Embodiment

Figure 1:
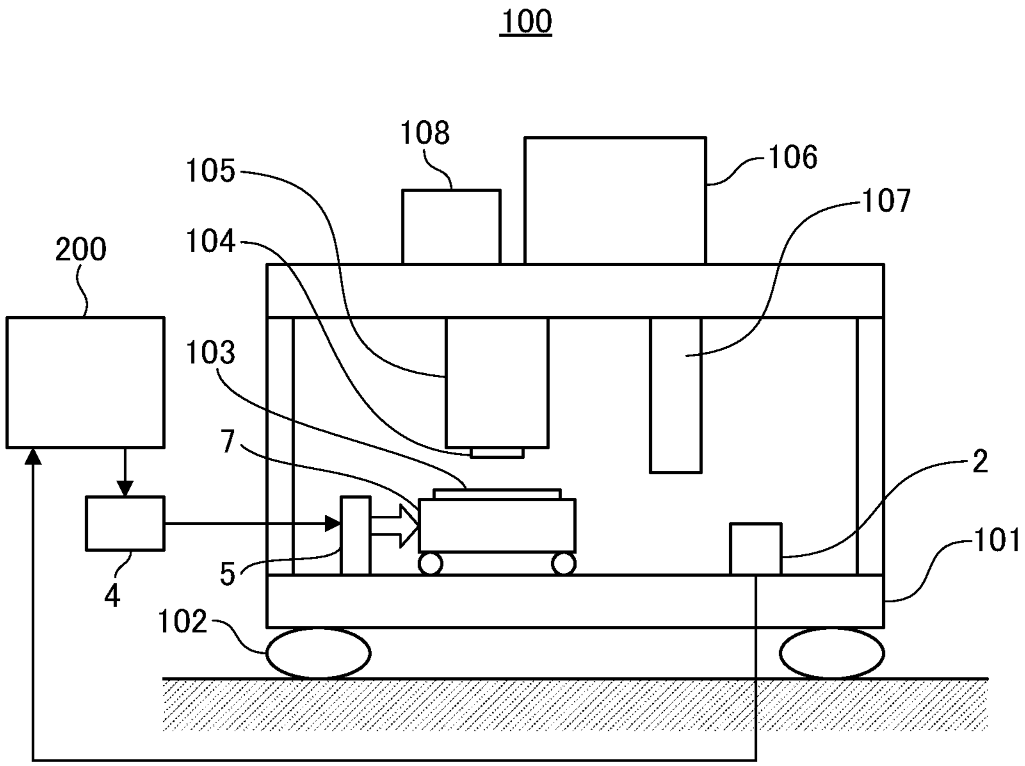
FIG. 1 is a diagram illustrating an imprint device according to a first embodiment.

In the First Embodiment, an imprint device will be explained as an example of a lithography device that forms a pattern on a substrate. FIG. 1 is a schematic diagram of the imprint device. The imprint device is a device that includes a forming unit that forms a pattern of a cured product to which a concavo-convex pattern of a mold is transferred, by bringing an imprinting material supplied onto a substrate into contact with the mold and applying curing energy to the imprinting material.

For example, the imprint device supplies an imprinting material onto a substrate, and cures the imprinting material in a state in which a mold where an concavo-convex pattern is formed is in contact with the imprinting material on the substrate. In addition, by widening the distance between the mold and the substrate to peel off (release) the mold from the cured imprinting material, the imprint device can transfer the pattern of the mold to the imprinting material on the substrate.

Such a series of processes is referred to as an imprinting process, and is performed for each of a plurality of shot areas of the substrate. In short, in the case of performing an imprinting process for each of a plurality of shot areas of one substrate, the imprinting process is repeatedly performed for the number of shot areas of one substrate.

In FIG. 1, an imprint device 100 includes a mechanical structure and a control system 200. A main body structure 101 of the imprint device 100 is placed on a floor with a tripod, or a quadruped anti-vibration mechanism 102 using an air spring or the like. A wafer (substrate) 103 is held by a wafer stage (substrate stage) 7 with a wafer chuck (not illustrated). The wafer stage 7 can move the wafer 103 in X and Y directions in order to perform an imprinting process on each shot area of the entire surface of the wafer 103.

In addition, the wafer stage 7 has sufficient X-directional and Y-directional strokes to enable moving the wafer 103 to a replacement position for loading and unloading the wafer 103 with a wafer replacement hand (not illustrated). Although the wafer stage 7 is simply illustrated as a box with wheels in FIG. 1, the wafer stage 7 is actually guided to move freely in the X-direction by using static pressure guidance, and is given a driving force in the X-direction by a linear motor (drive unit). In addition, a Y stage (not illustrated) is movable in the Y-direction on the wafer stage 7 by static pressure guidance and the linear motor.

A motor 5 serving as the drive unit is driven by an electric current driver 4 as a drive circuit. A moving unit for moving a wafer which serves as a to-be-moved object (controlled object), includes a stage, the motor 5 serving as a driving unit, and the electric current driver 4 serving as a driving circuit. Note that the configuration of the wafer stage 7 is not limited to this configuration, and a highly precise positioning stage used for a wafer stage for an exposure device may be used as appropriate.

The position in the X-direction (the left-to-right direction in figure) of the wafer stage 7 is measured by a position measuring unit 2. The position measuring unit 2 includes a scale (not illustrated) configured on the main body structure 101, a head on the wafer stage 7, and a linear encoder of an arithmetic unit. Similarly, a Y-axis encoder (not illustrated) for measuring the Y-direction (in a direction perpendicular to a paper surface) is also provided.

To measure the position of the wafer stage 7, a combination of an interferometer provided on the main body structure 101 and a reflection mirror provided on the wafer stage 7 may be used. A photo-curable resin serving as an imprinting material is supplied by a dispenser 107 to the position of a shot area of the wafer 103. At that time, the wafer stage 7 positions the resin coating position on the wafer directly below the dispenser 107. Next, the wafer stage 7 positions the resin coating on the wafer directly below a mold 104 on which a fine pattern is formed.

The mold 104 is held by an imprinting head 105. The imprinting head 105 is structured to be capable of moving the mold 104 in the Z-direction (the direction perpendicular to the X and Y directions). The mold 104 waits at a position above the wafer 103 in the Z direction until the position of the shot area of the wafer 103 moves directly below the mold 104. In response to positioning of the shot position of the wafer 103 directly below the mold 104, the mold 104 is lowered by the imprinting head 105 to press a pattern portion of the mold 104 against the resin.

To manufacture a semiconductor device or the like using the imprint device, accuracy of positioning with the previous layer is important in transferring the pattern of the mold 104 to the resin on the wafer 103. This positioning is referred to as the “alignment”. An alignment detector 106 optically detects alignment marks (not illustrated) provided on both the wafer 103 and the mold 104 to perform image processing, and detects misalignment of the alignment marks in the X- and Y-directions. This misalignment information is sent to the control system 200, which will be described below, and alignment is performed by correcting the X- and Y-positions of the wafer stage 7 or the imprinting head 105.

Upon completion of the alignment, a lighting system 108 irradiates the resin with exposure light (ultraviolet light) through a mold 104, which is transparent, to cure the resin. After the resin is cured, the imprinting head 105 raises the mold 104 and releases the mold 104 from the resin on the wafer 103. With this series of processes, a pattern corresponding to the pattern engraved in the mold 104 is transferred (formed) to the resin on the wafer 103.

Similarly, imprinting processes are sequentially performed while changing the shot area position, and, upon completion of the imprinting processes for all the shot areas of a single wafer, the wafer stage 7 moves to the wafer replacement position. Then, the imprinted wafer is collected by the wafer replacement hand (not illustrated), and the next new wafer is mounted.

Figure 2:
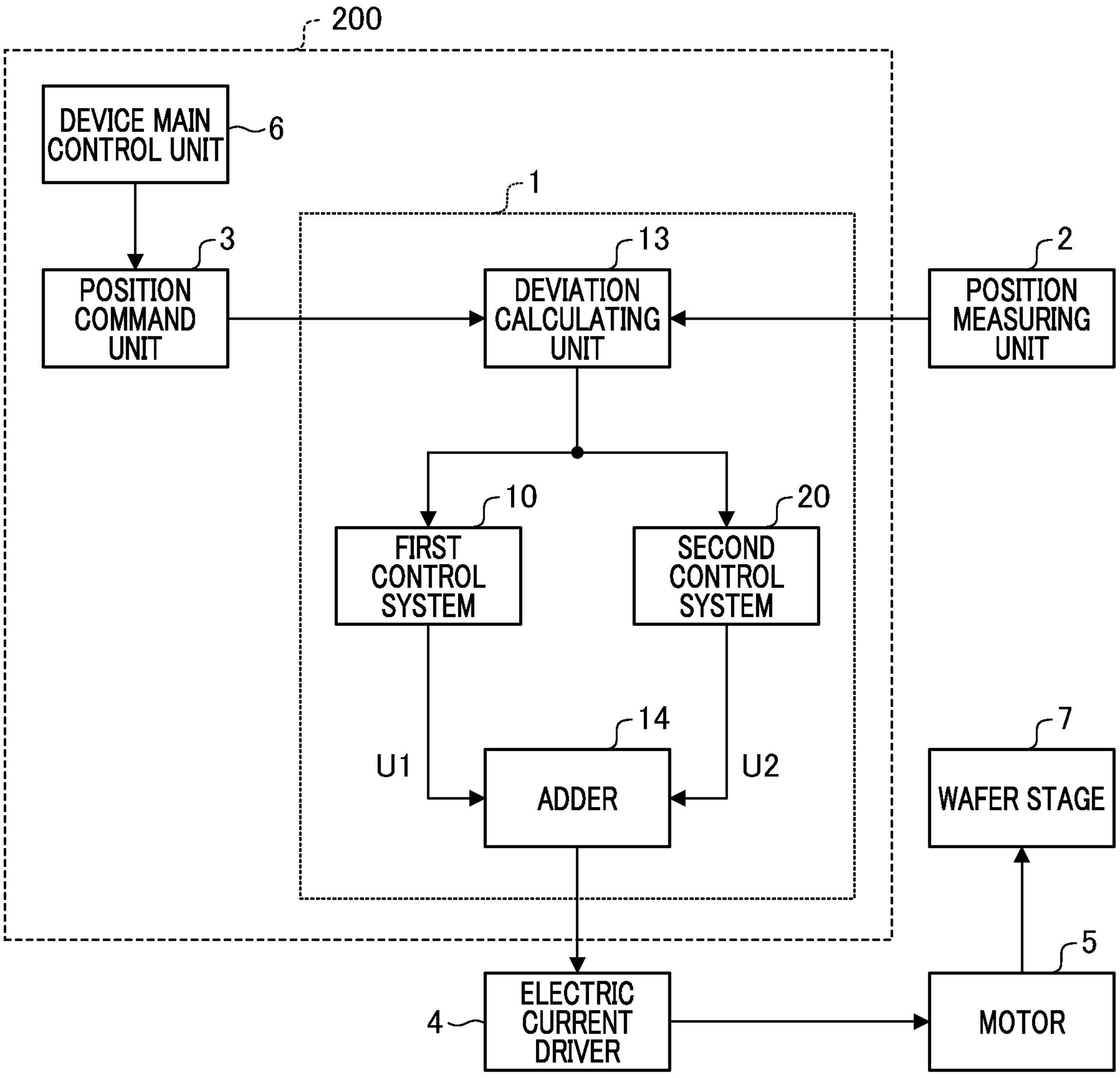
FIG. 2 is a functional block diagram illustrating the outline of a feedback controller for alignment and other positioning according to a first embodiment.

FIG. 2 is a schematic functional block diagram representing the feedback control device for carrying out positioning of the above alignment adjustment and other positioning according to the first embodiment. This feedback control device is configured within the imprint device and, takes as input information related to the control deviation between, for example, the measured value and the target value of the position of the stage, which is a controlled object, and outputs a control amount for the controlled object.

A portion inside a dotted line corresponds to the control system 200, and a digital calculator is used to perform complicated arithmetic calculations. The control system 200 includes arithmetic processing units such as a CPU and an FPGA serving as a computer, and a storage device such as memory that stores computer programs. A device main control unit 6 is a controller that controls the entire imprint device, and has the role of sending commands to a stage control unit 1 and other control units (not illustrated) on the basis of sequence management of a job performed by the imprint device.

A position command unit 3 obtains target coordinates of a stage position from the device main control unit 6, stores the target coordinates, and sends these values to the stage control unit 1. Misalignment information obtained by the above alignment detector 106 is also input to the position command unit 3 and is reflected in the target coordinates of the wafer stage 7. The position measuring unit 2 measures the stage position at every predetermined sampling time and sends the measured stage position to the stage control unit 1 (portion inside the dotted line in FIG. 2).

In the stage control unit 1, a deviation calculating unit 13 calculates the difference (a control deviation, hereinafter referred to as a "stage deviation") between the stage position (measured values) sent from the position measuring unit 2 and the target values of the stage position sent from the position command unit 3. The stage deviation is then sent to a first control system 10 and a second control system 20.

The first control system 10 uses a PID controller and outputs a first control amount U1 for the wafer stage 7 using information regarding a stage deviation as input. The first control system 10 functions as the first control unit that takes information regarding the control deviation as input, and outputs a first control amount for the controlled object and executes the first control process. Note that in the present embodiment, the first control system 10 outputs the control amount for the controlled object without using machine learning. However, machine learning may be used, for example, partially.

Figure 3:
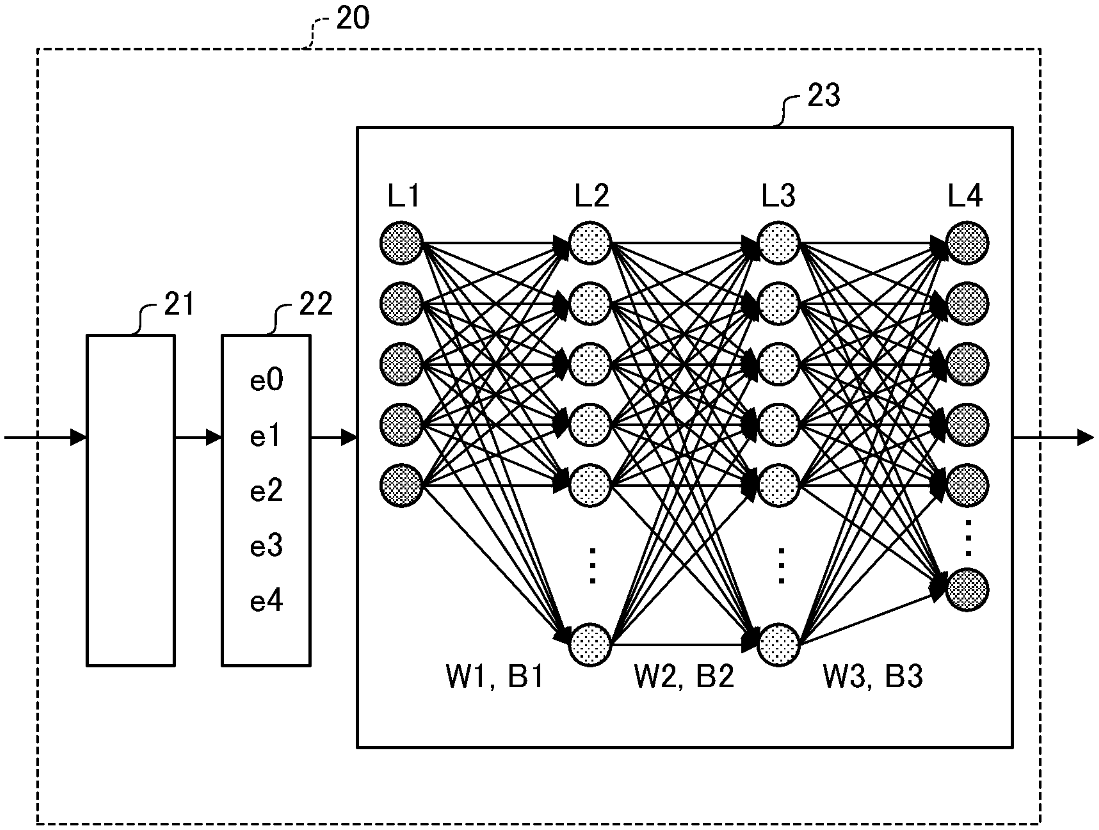
FIG. 3 is a diagram illustrating an example configuration of a second control system 20 according to a first embodiment.

In contrast, the second control system 20 includes a neural network (NN) 23 with a configuration such as that illustrated in FIG. 3. The second control system 20 takes information regarding the control deviation as input, and outputs the second control amount for the controlled object. In addition, the second control system 20 functions as the second control unit, wherein the parameters for calculating the second control amount are determined by machine learning, and executes the second control process. Note that the parameters determined by machine learning may be downloaded from external storage or stored in the imprint device 100.

FIG. 3 is a diagram illustrating an example of a configuration of the second control system 20. The second control system 20 includes a deviation memory 21, which samples and stores the history of stage deviations in a prescribed time cycle, input nodes 22 and a NN 23. FIG. 3 illustrates an example where the number of input nodes 22 is 5. The NN 23 includes an input layer L1, a first hidden layer L2, a second hidden layer L3, and an output layer L4. The first hidden layer L2 performs a predetermined weighting calculation on the signal of the input layer L1, and the second hidden layer L3 performs a weighting calculation on the output of the first hidden layer L2. The output layer L4 performs a weighting calculation on the output of the second hidden layer L3.

The coefficients (parameters) of each weighting calculation are adjusted in advance by some kind of machine learning. As a machine learning method, for example, a parameter adjustment method based on reinforcement learning that selects the action that maximizes the value through trial and error can be used. However, the parameter may also be adjusted using any machine learning method. Note that the number of hidden layers and nodes may be increased, but this will increase the amount of calculation and slow down processing speed.

Note that the NN 23 may be a network (policy network) that outputs an output as a second control amount U2 directly corresponding to the dimension of a command value, or may be a network (action value network) that calculates the value of a command value. In the case of an action value network, a selecting unit that selects an action with the maximum value is added after the NN 23, and a command value selected by the selecting unit is made the output of the second control system 20 as the second control amount U2.

An adder 14 outputs the sum of an output value U1 (first control amount) generated by the first control system 10 and an output value U2 (second control amount) generated by the second control system 20. The output (operation amount) of the adder 14 goes through a D/A converter (not illustrated) to become an analog signal, which is then sent and input to the electric current driver 4 to operates a controlled object by the motor 5. Here, the adder 14, the electric current driver 4 and the motor 5 function as the operation unit to operate the controlled object using the first control amount and the second control amount to execute the operation process. Note that, in this embodiment, the output value U1 (first control amount) generated by the first control system 10 and the output value U2 (second control amount) generated by the second control system 20 are added. However, multiplication and the like may also be used, or one or the other may be selected according to the situation.

The electric current driver 4 applies control to allow the value of electric current flowing through a coil of the motor 5 to become the output of the adder 14. The driving force of the motor 5 is proportional to the current flowing through the coil, thus, the force corresponding to the sum of the output values of the first control system 10 and the second control system 20 is applied to the wafer stage 7. The first control system 10 is mainly responsible for the position feedback control system, while the second control system 20 is controlled so as to suppress a stage deviation that cannot be fully compensated by the first control system 10. By configuring in this way, compared to a control system that carries out control by using only the first control system 10, a stage deviation can be made very small, thereby enabling improving the alignment accuracy of the stage (substrate) and other parts of the imprint device.

Figure 4A:
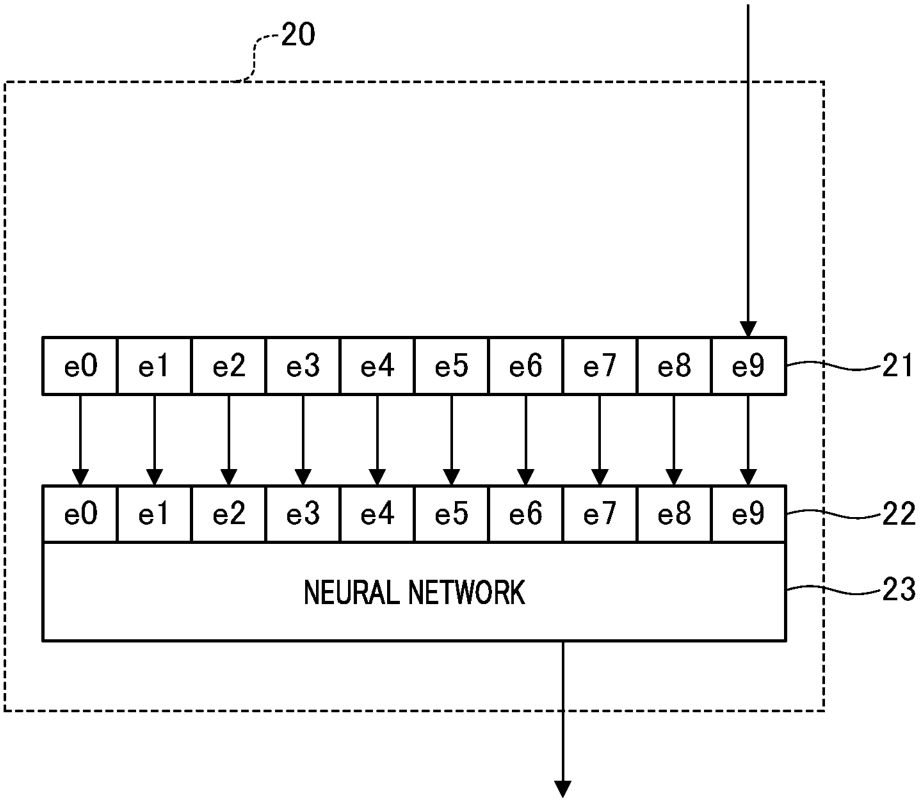
FIG. 4A is a diagram illustrating an example of the second control system 20, wherein the number of deviation memories 21 and the number nodes 22 of NN 23 are the same 10.
Figure 4B:
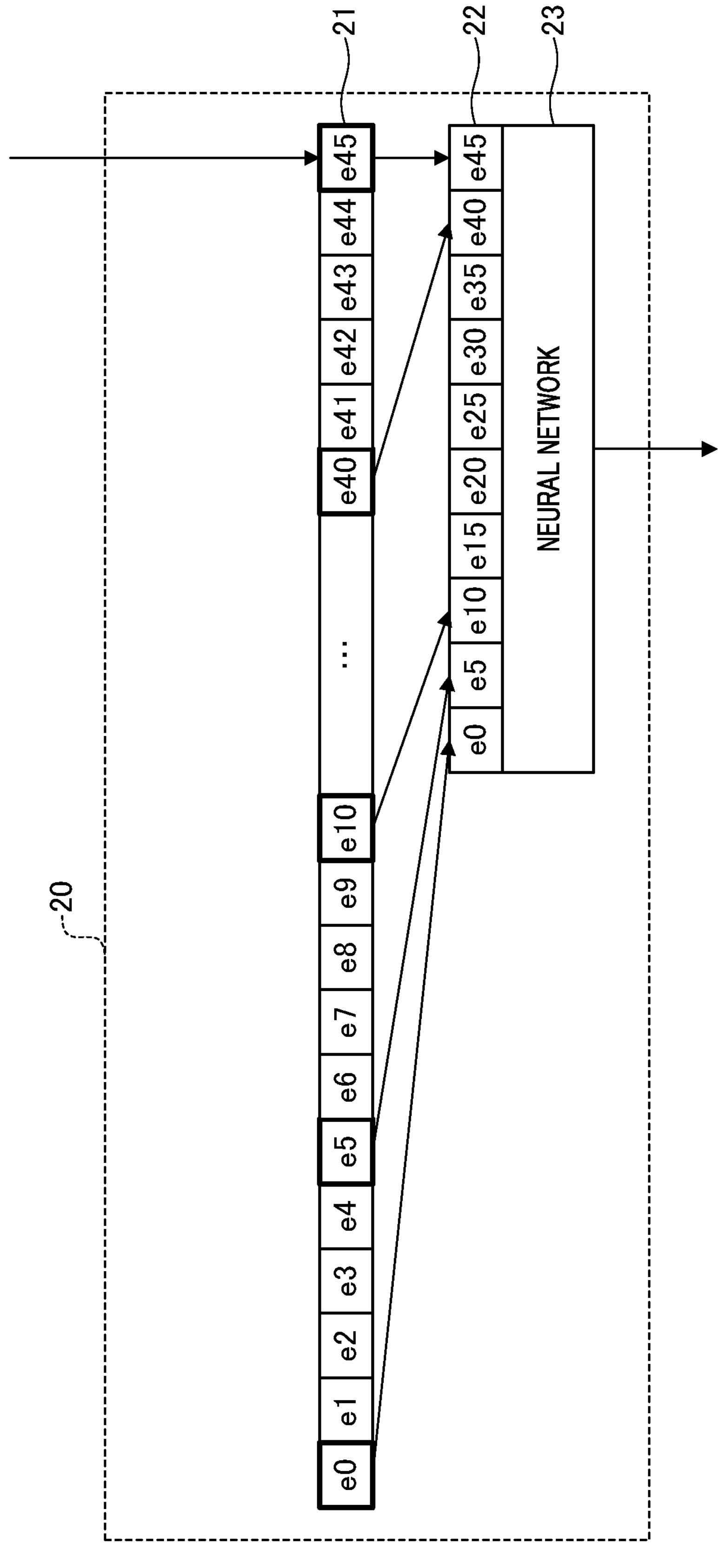
FIG. 4B is a diagram illustrating an example of the second control system 20, wherein the number of deviation memory 21 is larger than the number of nodes of the NN 23.

Next, a deviation memory of the second control system 20 will be explained using FIGS. 4A and 4B. FIGS. 4A and 4B are diagrams illustrating a deviation memory 21 of the second control system 20. The second control system 20 is comprised of the deviation memory 21 that samples and stores (updates) a stage deviation log in a prescribed time cycle (fixed time interval), and an NN 23 that, for example, is configured as illustrated in FIG. 3. In FIGS. 4A and 4B, an example is described in which the NN 23 has input nodes 22 and the number of input nodes 22 is 10. Based on a stage deviation that has been input, a network parameter weight and the like is adjusted so that the NN 23 outputs a correction value to correct the first control amount U1 of the first control system 10.

FIG. 4A is a diagram illustrating an example where the number of the deviation memory 21 and the number of node 22 of the NN 23 are the same 10 in the feedback control using both the first control system and the second control system with machine learning. When the sampling frequency of the stage control unit 1 is Fs=10 kHz, the sampling time is Ts=1/Fs=0.1 ms, and a new stage deviation is input to the deviation memory 21 every 0.1 ms. A stage deviation of 0.1 ms×10=1 ms time length is input to the NN 23.

In contrast, FIG. 4B is an illustration of an example of a feedback control according to the first embodiment, wherein the number of deviation memories 21 is larger than the number of input nodes 22 of the NN 23. The deviation memories 21 can store M (M is a natural number) stage deviations, and the most recent M stage deviation is stored. The stage deviations for the number of input nodes (N) of NN 23 are selected and input to NN 23 by thinning out M stage deviations in the deviation memory 21. Thus, the control deviation value is input to the input nodes 22 through the deviation memory 21. In addition, the deviation memory 21 functions as a sampling unit for thinning out information regarding the control deviation input to the second control unit (second control system 20) at a predetermined period, and executes the sampling process.

In the first embodiment, from M stage deviations, N stage deviations are input to the NN 23 every L units. The number M of deviation memory 21 is represented by $M=L\times(N-1)+1$. FIG. 4B illustrates the case where M=46, N=10, and L=5, wherein a new stage deviation is similarly input and updated in the deviation memory 21 every 0.1 ms (at a fixed time interval), as in FIG. 4A.

This is to synchronize the input between the first control system 10 and the second control system 20, because in the present embodiment, a new stage deviation is also input to the first control system 10 every 0.1 ms. That is, stage deviations are synchronized and input to the first control system and the second control system in the same period or an integer multiple of the periods. Thus, in the present embodiment, the control deviation input to the deviation memory 21 is configured to be updated every certain predetermined interval in synchronization with the input of the first control unit.

In the case of L=5, because the stage deviations are selected from the deviation memory 21 by thinning out the stage deviations every fifth stage deviation, the sampling time of the second control system 20 is pseudo changed to 0.1 ms×5=0.5 ms. Therefore, the time length of the stage deviation input to the NN 23 becomes 0.5 ms×10=5 ms. Accordingly, the second control system 20 of the first embodiment can input a stage deviation of a time length of a factor of 5 to NN 23 compared to the contrast example illustrated in FIG. 4A. That is, the sampling pitch of the deviation can be increased by a factor of five.

Figure 5:
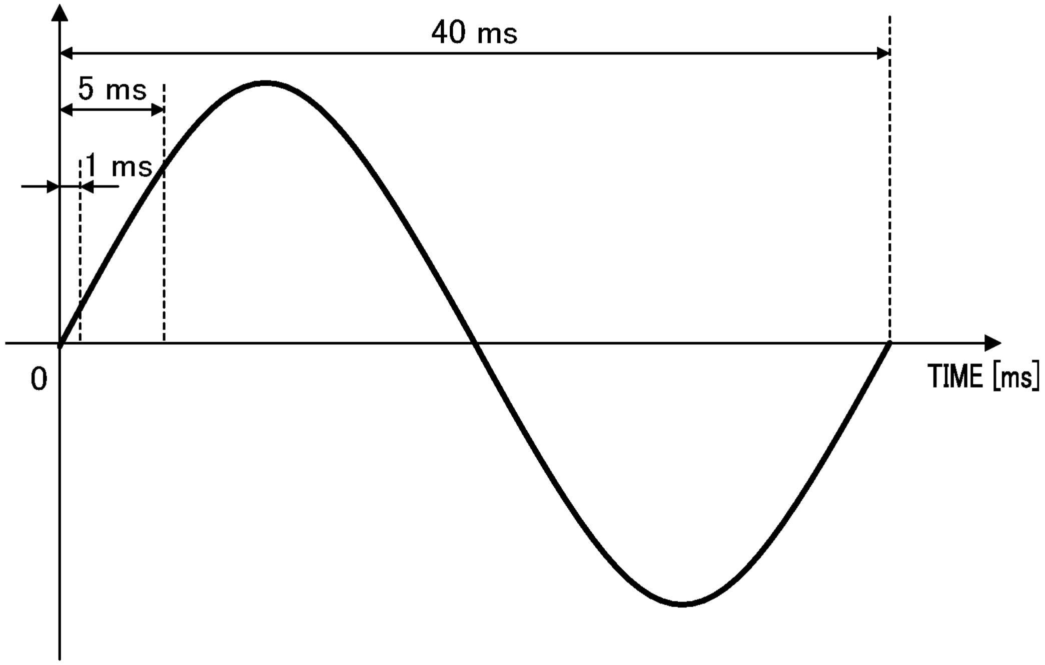
FIG. 5 a diagram illustrating one example of a disturbance vibration.

FIG. 5 is a diagram illustrating an example of low-frequency disturbance noise (disturbance vibration) that is desired to be suppressed. Low-frequency disturbance noise that is desired to be suppressed depends on the characteristics of the imprinting device itself, the installation conditions of the imprinting device, the aging of the device, and the like. In the example of low frequency disturbance noise illustrated in FIG. 5, the frequency is 25 Hz and the period is 40 ms. In the case of the example illustrated in FIG. 4A, only the signal for 1/40th the wavelength of the disturbance vibration that is desired to be suppressed can be input to the NN 23.

In contrast, the second control system 20 of the first embodiment can input a signal equivalent to 1/8 the wavelength of the low-frequency disturbance vibration that it is desired to be suppressed in the NN 23. That is, the product of the predetermined period (frequency of every fifth variation) of the second control unit, the fixed interval (0.1 ms), and the number of input nodes (10) of the second control unit is set to 1/8 or more of the period of the vibration to be suppressed, so that low-frequency disturbance noise can be sufficiently corrected.

Thus, in the first embodiment, because the disturbance vibration that is desired to be suppressed can be input to the NN 23 for a sufficient period, the network parameters of the NN 23 can be further optimized, and the disturbance vibration that is desired to be suppressed can be suppressed more effectively. Note that in order to input a sufficient number of low-frequency disturbance vibrations that are desired to be suppressed into the NN 23, there is also a method in which the number of input nodes N of the NN 23 may be increased. However, by increasing the number of input nodes, the number of nodes in the hidden layer also increases, thus resulting in a large increase in the amount of calculation for the second control system 20, which may result in a failure of the arithmetic processing to be completed in time.

As described above, in the first embodiment, the feedback control device is configured to lengthen the sampling time of the second control system, in a pseudo manner, while keeping the sampling frequency of the stage control unit 1 high. This enables the second control system to sufficiently suppress low-frequency disturbance noise without increasing the calculation amount of the second control system, while maintaining the control performance of the first control system 10. Thus, according to the lithography device of the example, a highly accurate pattern for lithography can be formed by a forming unit using a stage as a controlled object controlled by a feedback control device. Note that the controlled object is not limited to a stage, and may be a mold.

Second Embodiment

Figure 6:
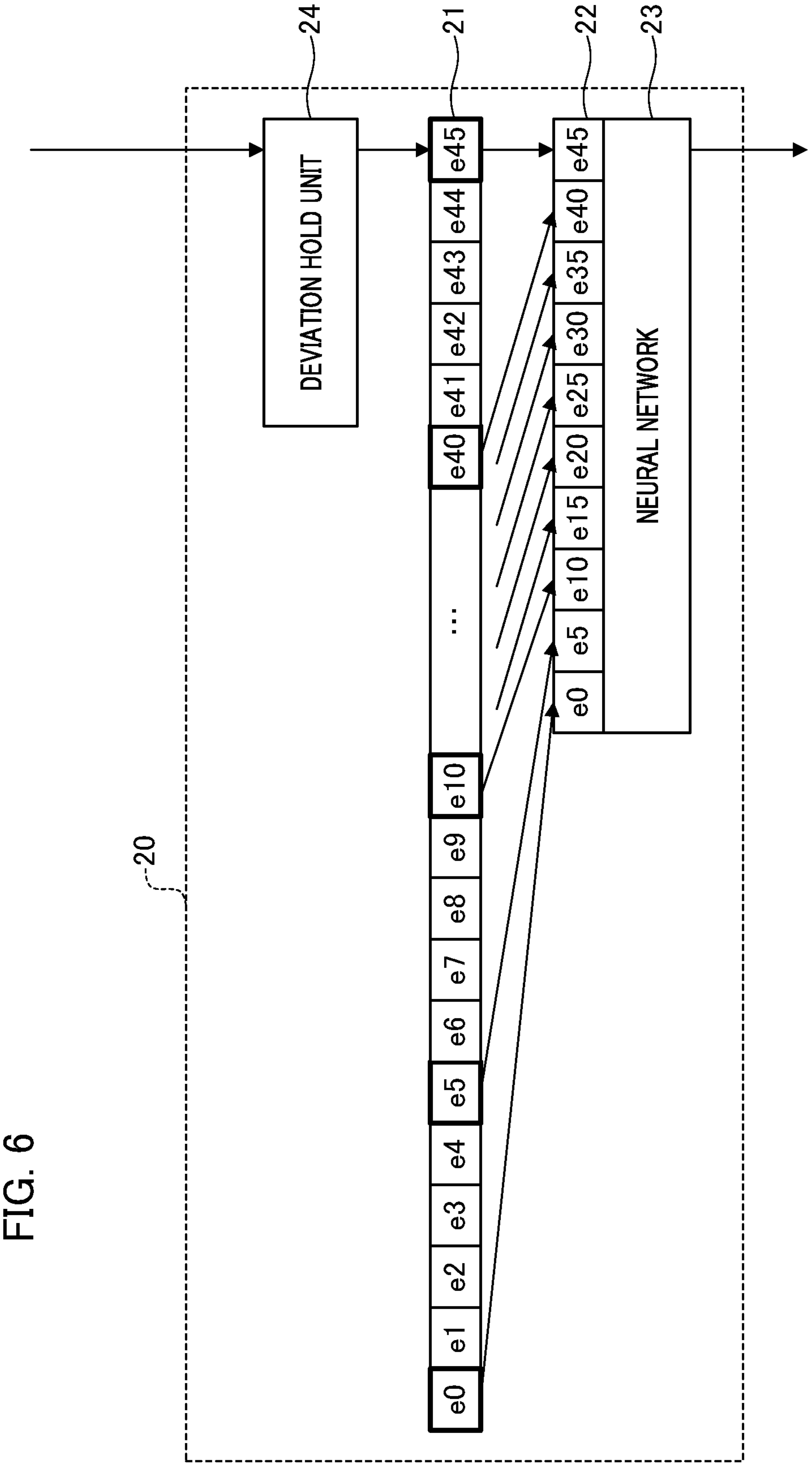
FIG. 6 is a schematic diagram of a second control system according to a second embodiment.

Next, based on FIG. 6, a feedback control device of the second embodiment will be described. FIG. 6 is a schematic diagram of a second control system according to a second embodiment. Further, as in the first embodiment, an example with M=46, N=10, and L=5 is illustrated.

However, in a second control system 20 of the second embodiment, as shown in FIG. 6, a deviation hold unit 24 is provided to hold a stage deviation input to the second control system 20 for a predetermined interval (for L sample intervals). As a result, the same deviations are input into the deviation memory 21 for every L sample intervals (in the case of FIG. 6, for every five sample intervals). Here, the deviation hold unit 24 functions as a hold unit that holds the control deviation input to the deviation memory 21 for a predetermined interval.

In the case of a sampling frequency Fs=10 kHz, in the first embodiment, the stage deviation input to a NN 23 will also be updated at 10 kHz. However, in the second embodiment, the stage deviation input to the NN 23 is updated at 10 kHz/5=2 kHz. That is, the sampling frequency of the second control system 20 is lowered in a pseudo manner to 2 kHz.

Because the sampling frequency of the second control system 20 of the first embodiment is 10 kHz, according to the sampling theorem, fluctuations of up to 5 kHz can be measured. In contrast, because the sampling frequency of the second control system 20 in the second embodiment is 2 kHz, according to the sampling theorem, it is only possible to measure up to 1 kHz. That is, the second control system 20 of the second embodiment has a 1 kHz low-pass filter added to the first stage of the NN 23.

In the case that a low-frequency disturbance vibration is desired to be suppressed by the second control system 20, by inputting a stage deviation that has had its high-frequency components removed into the NN 23, the network parameters of the NN 23 can be further optimized, and the low-frequency disturbance noise that is desired to be suppressed can be suppressed more effectively. Thus, in the present embodiment, in a sampling unit, information with respect to the above-described control deviation that is input to a second control unit is thinned out at a predetermined period, but the predetermined interval is set according to the frequency of the disturbance noise. Setting can be performed manually or automatically. In the case of automatic, the frequency of the disturbance noise may be automatically detected using a spectrum analyzer or the like, and the thinning period (predetermined interval) in the sampling unit may be set in accordance with the frequency of the detected disturbance noise.

Third Embodiment

In the above embodiments, a mold having a pattern portion was used in the imprint device. However, the above-described feedback control device can also be applied to what is termed a planarization device (molding device) that molds a resin composition and the like on a substrate to flatten it using a planarizing device that includes a flat mold without a pattern portion. That is, the above-described feedback control device can also be applied to the position control of a controlled object, for example, the mold and substrate stages of a planarization device (molding device).

In addition, the above-described feedback control device can also be applied to position control of a mask or substrate stage in an exposure device, the exposure device including a forming unit that illuminates the mask and projects a pattern of the mask onto a substrate by means of a projection optical system to form the pattern on the substrate. It can be further applied to a measurement device or a processing device other than the imprint device.

The measurement device can include the above-described feedback control device in order to control the position of a target object (controlled object), and a measurement unit that measures the object whose position is controlled by the feedback control device. Examples of a measurement unit include a contact-type probe and a contactless interferometer. In addition, the processing device can include the above-described feedback control device in order to control the position of a target object, and also can include a processing unit that processes the object whose position is controlled by the feedback control device. Examples of the processing unit include a bite or a laser for cutting.

(Method of Manufacturing Article)

The feedback control device of the present embodiment is suitable for a method for manufacturing an article such as a microdevice (for example, a semiconductor device) or an element having a microstructure. An article manufacturing method according to the present embodiment includes a step of forming a pattern on an imprint material supplied (applied) to a substrate by using a lithography device, using the above-described imprinting device (imprinting method). A step of processing the substrate on which the pattern has been formed in the such a step and a manufacturing step that manufactures an article from the processed substrate are further included.

Further, this manufacturing method includes other well-known steps (for example, oxidization, deposition, vapor deposition, doping, planarization, etching, resist removal, dicing, bonding, and packaging). The article manufacturing method using the feedback control device of the present embodiment has higher positioning accuracy and is advantageous in at least one of the performance, quality, productivity, and production cost of the article, compared to the conventional method.

Next, a method for manufacturing an article using a lithography device such as an exposure device using the above-described feedback control device (for example, a semiconductor IC element, a liquid crystal display element, a color filter, or a MEMS) will be explained. The article is manufactured by: a step of exposing, using the above-described exposure device and the like, a substrate (such as a wafer or a glass substrate) coated with a photosensitive agent; a step of developing the substrate (photosensitive agent); and processing the developed substrate in other conventional processing steps. The other conventional steps include etching, resist stripping, dicing, bonding, and packaging. According to the present manufacturing method, an article whose quality is higher than conventional ones may be manufactured.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to this embodiment, a computer program realizing the function of the above-described embodiment may be supplied to the feedback control device, lithography device, measurement device, machining device, or planarizing device and the like through a network or various storage media. Then, a computer (or a CPU, an MPU, or the like) of the feedback control device, lithography device, measurement device, machining device, or planarizing device and the like may be configured to read and execute the program. In such a case, the program and the storage medium storing the program configure the present invention.

This application claims the benefit of Japanese Patent Application No. 2020-167743 filed on Oct. 2, 2020, which is hereby incorporated by reference herein in its entirety.

What is claimed is:

1. A feedback control device that takes information regarding a history of a control deviation between a measured value and a target value of a controlled object as input, and outputs a control amount for the controlled object, comprising:

at least one processor or circuit configured to function as:

a control unit configured to take a predetermined number of control deviation data included in the information regarding the history of the control deviation as input and to output the control amount for the controlled object, and in which a parameter for calculating the control amount is determined by machine learning;

an operation unit configured to operate the controlled object using the control amount output from the control unit; and a sampling unit configured to thin out, at a predetermined period, the information regarding the history of the control deviation so that the predetermined number of control deviation data input to the control unit is selected, wherein the control unit includes a plurality of input nodes, and the control deviation is input to the input nodes via a memory capable of storing a plurality of the control deviations that is greater than the number of the input nodes, wherein the control deviation input to the memory is updated every predetermined interval, and wherein a product of the predetermined period of the control unit, the predetermined interval, and the number of input nodes of the control unit is ⅛ or more of a period of a vibration to be suppressed.

2. The feedback control device according to claim 1, wherein the sampling unit is configured to select, at the predetermined period, the predetermined number of control deviation data from a plurality of control deviation data included in the information regarding the history of the control deviation.

3. The feedback control device according to claim 1, wherein the sampling unit is configured to thin out, at the predetermined period, the information regarding the history of the control deviation so that a time length of the predetermined number of control deviation data increases.

4. The feedback control device according to claim 1, wherein the sampling unit is configured to thin out, at the predetermined period, the information regarding the history of the control deviation so that a sampling pitch of the predetermined number of control deviation data increases.

5. The feedback control device according to claim 1, wherein the sampling unit provides the plurality of the control deviations stored in the memory to the input nodes by thinning them out at the predetermined period.

6. The feedback control device according to claim 1, wherein the predetermined period is a value that is set according to the period of a disturbance noise.

7. The feedback control device according to claim 1, further comprising a hold unit configured to hold the control deviation input to the memory for the predetermined interval.

8. A lithography device using a feedback control device, wherein the feedback control device takes information regarding a history of a control deviation between a measured value and a target value of a controlled object as input, and outputs a control amount for the controlled object;

wherein the feedback control device comprises:

at least one processor or circuit configured to function as:

a control unit configured to take a predetermined number of control deviation data included in the information regarding the history of the control deviation as input and to output the control amount for the controlled object, and in which a parameter for calculating the control amount is determined by machine learning;

an operation unit configured to operate the controlled object using the control amount output from the control unit; and a sampling unit configured to thin out, at a predetermined period, the information regarding the history of the control deviation so that the predetermined number of control deviation data input to the control unit is selected, wherein the control unit includes a plurality of input nodes, and the control deviation is input to the input nodes via a memory capable of storing a plurality of the control deviations that is greater than the number of the input nodes, wherein the control deviation input to the memory is updated every predetermined interval, and wherein a product of the predetermined period of the control unit, the predetermined interval, and the number of input nodes of the control unit is ⅛ or more of a period of a vibration to be suppressed; and wherein the lithography device comprises a forming unit configured to form a pattern for lithography using the controlled object that is controlled by the feedback control device.

9. A measurement device using a feedback control device, wherein the feedback control device takes information regarding a history of a control deviation between a measured value and a target value of a controlled object as input, and outputs a control amount for the controlled object;

wherein the feedback control device comprises:

at least one processor or circuit configured to function as:

a control unit configured to take a predetermined number of control deviation data included in the information regarding the history of the control deviation as input and to output the control amount for the controlled object, and in which a parameter for calculating the control amount is determined by machine learning;

an operation unit configured to operate the controlled object using the control amount output from the control unit; and a sampling unit configured to thin out, at a predetermined period, the information regarding the history of the control deviation so that the predetermined number of control deviation data input to the control unit is selected, wherein the control unit includes a plurality of input nodes, and the control deviation is input to the input nodes via a memory capable of storing a plurality of the control deviations that is greater than the number of the input nodes, wherein the control deviation input to the memory is updated every predetermined interval, and wherein a product of the predetermined period of the control unit, the predetermined interval, and the number of input nodes of the control unit is ⅛ or more of a period of a vibration to be suppressed; and wherein the measurement device comprises a measurement unit configured to measure the position of the controlled object that is controlled by the feedback control device.

10. A processing device that processes a controlled object whose position is controlled using a feedback control device, wherein the processing device comprises at least one first processor or first circuit configured to process the controlled object controlled by the feedback control device;

wherein the feedback control device takes information regarding a history of a control deviation between a measured value and a target value of the controlled object as input, and outputs a control amount for the controlled object; and wherein the feedback control device comprises:

at least one second processor or second circuit configured to function as:

a control unit configured to take a predetermined number of control deviation data included in the information regarding the history of the control deviation as input and to output the control amount for the controlled object, and in which a parameter for calculating the control amount is determined by machine learning;

an operation unit configured to operate the controlled object using the control amount output from the control unit; and a sampling unit configured to thin out, at a predetermined period, the information regarding the history of the control deviation so that the predetermined number of control deviation data input to the control unit is selected, wherein the control unit includes a plurality of input nodes, and the control deviation is input to the input nodes via a memory capable of storing a plurality of the control deviations that is greater than the number of the input nodes, wherein the control deviation input to the memory is updated every predetermined interval, and wherein a product of the predetermined period of the control unit, the predetermined interval, and the number of input nodes of the control unit is ⅛ or more of a period of a vibration to be suppressed.

11. A planarizing device using a feedback control device, wherein the feedback control device takes information regarding a history of a control deviation between a measured value and a target value of a controlled object as input, and outputs a control amount for the controlled object;

wherein the feedback control device comprises:

at least one processor or circuit configured to function as:

a control unit configured to take a predetermined number of control deviation data included in the information regarding the history of the control deviation as input and to output the control amount for the controlled object, and in which a parameter for calculating the control amount is determined by machine learning;

an operation unit configured to operate the controlled object using the control amount output from the control unit; and a sampling unit configured to thin out, at a predetermined period, the information regarding the history of the control deviation so that the predetermined number of control deviation data input to the control unit is selected, wherein the control unit includes a plurality of input nodes, and the control deviation is input to the input nodes via a memory capable of storing a plurality of the control deviations that is greater than the number of the input nodes, wherein the control deviation input to the memory is updated every predetermined interval, and wherein a product of the predetermined period of the control unit, the predetermined interval, and the number of input nodes of the control unit is ⅛ or more of a period of a vibration to be suppressed; and wherein the planarizing device comprises a planarizing unit configured to planarize a composition using the controlled object that is controlled by the feedback control device.

12. An article manufacturing method using a lithography device, wherein the lithography device comprises a feedback control device;

wherein the feedback control device takes information regarding a history of a control deviation between a measured value and a target value of a controlled object as input, and outputs a control amount for the controlled object;

wherein the feedback control device comprises:

at least one processor or circuit configured to function as:

a control unit configured to take a predetermined number of control deviation data included in the information regarding the history of the control deviation as input and to output the control amount for the controlled object, and in which a parameter for calculating the control amount is determined by machine learning;

an operation unit configured to operate the controlled object using the control amount output from the control unit; and a sampling unit configured to thin out, at a predetermined period, the information regarding the history of the control deviation so that the predetermined number of control deviation data input to the control unit is selected, wherein the control unit includes a plurality of input nodes, and the control deviation is input to the input nodes via a memory capable of storing a plurality of the control deviations that is greater than the number of the input nodes, wherein the control deviation input to the memory is updated every predetermined interval, and wherein a product of the predetermined period of the control unit, the predetermined interval, and the number of input nodes of the control unit is ⅛ or more of a period of a vibration to be suppressed;

wherein the lithography device comprises a forming unit configured to form a pattern for lithography using the controlled object that is controlled by a feedback control device; and wherein the manufacturing method comprises:

a step for forming a pattern on a substrate using the lithography device;

a step for processing the substrate on which the pattern is formed; and a manufacturing step for manufacturing an article from the processed substrate.

13. A non-transitory computer-readable storage medium configured to store a computer program to control each unit of a feedback control device;

wherein the feedback control device takes information regarding a history of a control deviation between a measured value and a target value of a controlled object as input, and outputs a control amount for the controlled object;

the feedback control device comprising:

at least one processor or circuit configured to function as:

a control unit configured to take a predetermined number of control deviation data included in the information regarding the history of the control deviation as input and to output the control amount for the controlled object, and in which a parameter for calculating the control amount is determined by machine learning;

an operation unit configured to operate the controlled object using the control amount output from the control unit; and a sampling unit configured to thin out, at a predetermined period, the information regarding the history of the control deviation so that the predetermined number of control deviation data input to the control unit is selected, wherein the control unit includes a plurality of input nodes, and the control deviation is input to the input nodes via a memory capable of storing a plurality of the control deviations that is greater than the number of the input nodes, wherein the control deviation input to the memory is updated every predetermined interval, and wherein a product of the predetermined period of the control unit, the predetermined interval, and the number of input nodes of the control unit is ⅛ or more of a period of a vibration to be suppressed.

14. A feedback control method that takes information regarding a history of a control deviation between a measured value and a target value of a controlled object as input, and outputs a control amount for the controlled object, the feedback control method comprising the following steps:

a control step for taking a predetermined number of control deviation data included in the information regarding the history of the control deviation as input and to output the control amount for the controlled object, and in which a parameter for calculating the control amount is determined by machine learning;

an operation step for operating the controlled object using the first control amount output by the control step; and a sampling step for thinning out, at a predetermined period, the information regarding the history of the control deviation so that the predetermined number of control deviation data input to the control step is selected, wherein the control deviation is input to a plurality of input nodes via a memory capable of storing a plurality of the control deviations that is greater than the number of the input nodes, wherein the control deviation input to the memory is updated every predetermined interval, and wherein a product of the predetermined period, the predetermined interval, and the number of input nodes is ⅛ or more of a period of a vibration to be suppressed.

* * * * *